US007852050B2

(12) United States Patent
Berggren et al.

(10) Patent No.: US 7,852,050 B2
(45) Date of Patent: *Dec. 14, 2010

(54) APPARATUS AND METHOD FOR SIMULTANEOUS PROVISION OF POWER FLOW CONTROL IN A THREE-PHASE AC TRANSMISSION LINE

(75) Inventors: Bertil Berggren, Västerås (SE); Mojtaba Noroozian, Västerås (SE)

(73) Assignee: ABB Research Ltd., Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/295,162

(22) PCT Filed: Mar. 28, 2006

(86) PCT No.: PCT/SE2006/000380

§ 371 (c)(1), (2), (4) Date: Mar. 16, 2009

(87) PCT Pub. No.: WO2007/111541

PCT Pub. Date: Oct. 4, 2007

(65) Prior Publication Data

US 2009/0218993 A1    Sep. 3, 2009

(51) Int. Cl.
G05F 3/04 (2006.01)

(52) U.S. Cl. ............... 323/216; 323/232; 323/340; 323/352; 323/361

(58) Field of Classification Search ............ 323/215, 323/216, 218, 232, 255, 256, 257, 258, 293, 323/300, 301, 340, 341, 343, 352, 355, 358, 323/359, 361
See application file for complete search history.

(56) References Cited

U.S. PATENT DOCUMENTS

| | | | | |
|---|---|---|---|---|
| 3,821,456 A | * | 6/1974 | Havas | 373/150 |
| 5,166,597 A | * | 11/1992 | Larsen et al. | 323/215 |
| 5,227,713 A | * | 7/1993 | Bowler et al. | 322/58 |
| 5,469,044 A | | 11/1995 | Gyugyi et al. | |
| 5,619,119 A | * | 4/1997 | Pelletier et al. | 323/215 |
| 5,907,239 A | * | 5/1999 | Pelletier et al. | 323/361 |
| 6,737,837 B1 | | 5/2004 | Halvarsson et al. | |
| 2008/0157748 A1 | * | 7/2008 | Berggren et al. | 323/356 |
| 2008/0258559 A1 | * | 10/2008 | Berggren et al. | 307/31 |
| 2008/0265848 A1 | * | 10/2008 | Berggren et al. | 323/211 |
| 2009/0134850 A1 | * | 5/2009 | Berggren et al. | 323/215 |
| 2009/0218993 A1 | * | 9/2009 | Berggren et al. | 323/205 |
| 2009/0251932 A1 | * | 10/2009 | Owen | 363/44 |

OTHER PUBLICATIONS

Bridenbaugh et al, "Voltage control improvement through capacitor and transformer tap optization", Feb. 7, 1992 IEEE transactions on powwer systems, No. 1, pp. 222-227.*
Bjelogrlic et al, "Application of Newtons optimal power flow in voltage/reactive power control", 1989 IEEE, pp. 105-111.*

(Continued)

*Primary Examiner*—Jeffrey L Sterrett
(74) *Attorney, Agent, or Firm*—Venable LLP; Eric J. Franklin

(57) ABSTRACT

A device for control of power flow in a three-phase ac transmission line. The device includes a series transformer unit, a shunt transformer unit, and a reactance unit.

10 Claims, 12 Drawing Sheets

OTHER PUBLICATIONS

Larsen, "A classical approach to consrtructing a power flow controller", 1999 IEEE, pp. 1192-1195.*

Gerbex et al, "Optimal location of muti-type FACTS devices in a power system by means of genetic algorithms", Aug. 2001 IEEE transactions on power systems, vol. 16, No. 3, pp. 537-544.*

International Search Report, dated Oct. 27, 2006, issued in related International Application No. PCT/SE2006/000380.

Written Opinion of the International Searching Authority, dated Oct. 27, 2006, issued in related PCT/SE2006/000380.

* cited by examiner

APPARATUS AND METHOD FOR SIMULTANEOUS PROVISION OF POWER FLOW CONTROL IN A THREE-PHASE AC TRANSMISSION LINE

CROSS-REFERENCE TO RELATED APPLICATIONS

This application is the national phase under 35 U.S.C. §371 of PCT/SE2006/000380 filed 28 Mar. 2006.

FIELD OF INVENTION

The present invention relates to a device and a method for control of power flow in a three-phase transmission line.

BACKGROUND

Different kinds of devices for both static and dynamic control of the power flow in such a transmission line are known. The object of the control may be a static distribution of power between power lines or power networks, as well as damping of power oscillations in the transmission line.

A phase shifting transformer (PST) is previously known for controlling the power flow in an ac transmission line, i.e., a three-phase ac line that interconnects two electric power networks and transmits active power between the power networks. There are a number of different previously known designs of phase-shifting transformers. FIG. 1 shows a principal circuit diagram corresponding to one such known design commonly referred to as the quadrature booster design and known from the U.S. Pat. No. 6,737,837 B1. The main parts of this device are a shunt transformer with exciter winding and regulating winding, a series transformer with a booster winding and a series winding, and an on-load tap-changer with which it is possible to regulate the phase-shift introduced by the PST. The line voltage at Node 1 is applied to the exciter winding of the shunt transformer and transformed to the regulating winding according to the turns ratio. With the on-load tap-changer it is possible to extract a portion of the regulating winding voltage and feed it into the booster winding of the series transformer. The voltage applied to the booster winding is then transformed to the series winding according to the turns ratio. The combination of Y-connected regulating winding and the delta-connected booster winding introduces a 90 degrees phase-shift of the voltage which as a result gives an induced series voltage across the series winding which is in quadrature with the voltage in Node 1. FIG. 2 describes a simplified positive sequence circuit diagram of the same quadrature booster as depicted in FIG. 1, wherein the 90 degrees phase-shift is symbolized with $\alpha = e^{j\beta}$ and $$\beta = \pm \frac{\pi}{2}.$$

By controlling the magnitude of the voltage across the series winding by means of the tap-changer, the phase-shift between the voltages in Node 1 and Node 2 is controlled. By controlling the phase-shift between the voltages in Node 1 and Node 2 it is possible to control the distribution of power flow between on one hand the path in which the PST is installed and on the other hand on parallel paths in the power system network.

Advantageous is the capability of the phase shifting transformers to block parasitic power flow due to phase angle difference in a feeding network. Power may be distributed to customer in a defined way and circulating power flows may be avoided.

However, the use of a PST offers a slow control speed. The tap-changer has to go through every tap position in a sequential manner. Each tap-change is effected in the order of 3-5 seconds. Thus the PST cannot participate in a decisive way in a transient period following a power disturbance. Further frequent tap changing, in particular at high current conditions, increases the need for maintenance.

The tap-changer is a mechanical device and thus slow and an object to mechanical wear. It has a maximum regulation voltage range of 150 kV and the maximum number of operating steps is less than 35. The maximum tap voltage is in the order of 4000-5000 V between two tap positions and the maximum rated throughput current is about 3000-4500 A. The maximum power handling capacity is 6000-8000 kVA/tap and there is a short circuit thermal limit. Small voltage steps result in a greater number of mechanical operations.

Furthermore, the PST consumes reactive power due to its short-circuit reactances. FIG. 3 illustrates the control range in terms of effective phase-shift and reactive power balance for a given through current, wherein the reactive power balance of the PST is on the x-axis and the phase-shift is on the y-axis. The reactive power consumption increases quadratic with the line current and is thus pronounced at high loading of the power system.

SUMMARY OF THE INVENTION

An object of the present invention is to provide a device and a method of the kind described in the introduction, which, in relation to the prior art, constitute an improvement with respect to the above-mentioned drawbacks.

The invention is based on the realization that a controllable reactance unit can be provided between the series transformer unit and shunt transformer unit in order to simultaneously provide both power flow control and voltage support control.

According to the invention there is provided a device for control of power flow in a three-phase ac trans-mission line, the device comprising: a series trans-former unit comprising for each of the phases of the transmission line a series transformer with a primary winding and a secondary-winding, wherein the secondary winding is adapted for serial connection into the respective phase of the transmission line, and a shunt transformer unit comprising for each of the phases of the transmission line a shunt transformer with a primary winding and a secondary winding, wherein the primary winding is adapted to be connected between the trans-mission line and ground, the device being characterized by a reactance unit comprising for each of the phases of the transmission line, a first and a second controllable reactance serially connected between the secondary winding of the shunt transformers and ground, wherein junction points are provided between the first and second controllable reactances, and wherein the primary winding of the series transformer of each of the phases is connected to the junction points between the controllable reactances of the other two phases of the transmission line.

Thus there is provided a device for power flow control, which simultaneously provides both power flow and voltage support control.

In a preferred embodiment, the controllable reactances comprise semiconductors, preferably thyristors, for controlling the reactance values. The provision of semi-conductor switches enables fast control in case of e.g., transients.

In a preferred embodiment, each of the shunt trans-formers comprises a tap-changer to which the respective controllable reactance is connected. By means of the tap-changers, the overall characteristics of the power flow control device can be changed in order to take into account slow changes in the power system.

BRIEF DESCRIPTION OF DRAWINGS

Other features and advantages of the present invention will become more apparent to a person skilled in the art from the following detailed description in conjunction with the appended drawings in which.

DETAILED DESCRIPTION OF PREFERRED EMBODIMENTS

In the following a detailed description of preferred embodiments of the present invention will be given.

Figure 1:
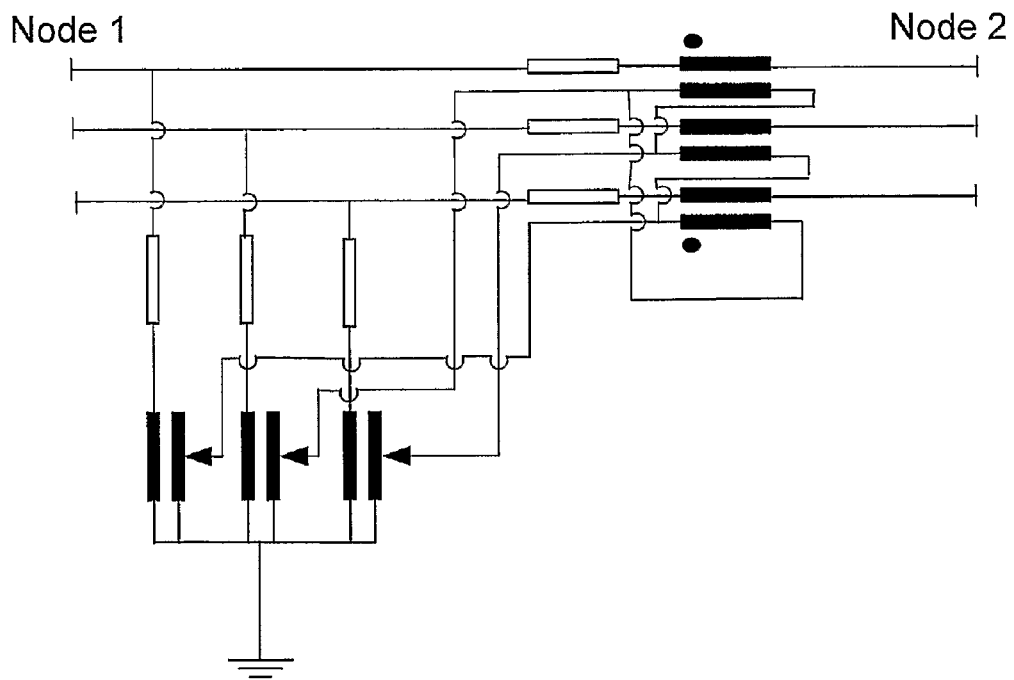
FIG. 1 is a three-phase circuit diagram of a prior art phase-shifting transformer of quadrature booster design.
Figure 2:
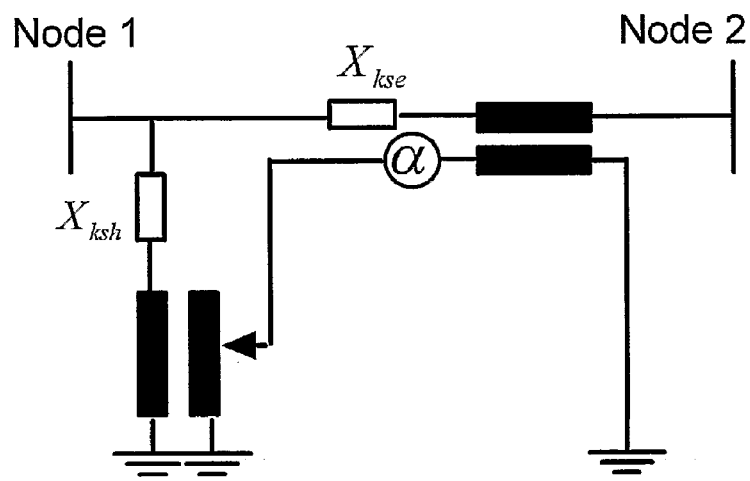
FIG. 2 is a simplified positive sequence circuit diagram of the prior art phase-shifting transformer of FIG. 1.
Figure 3:
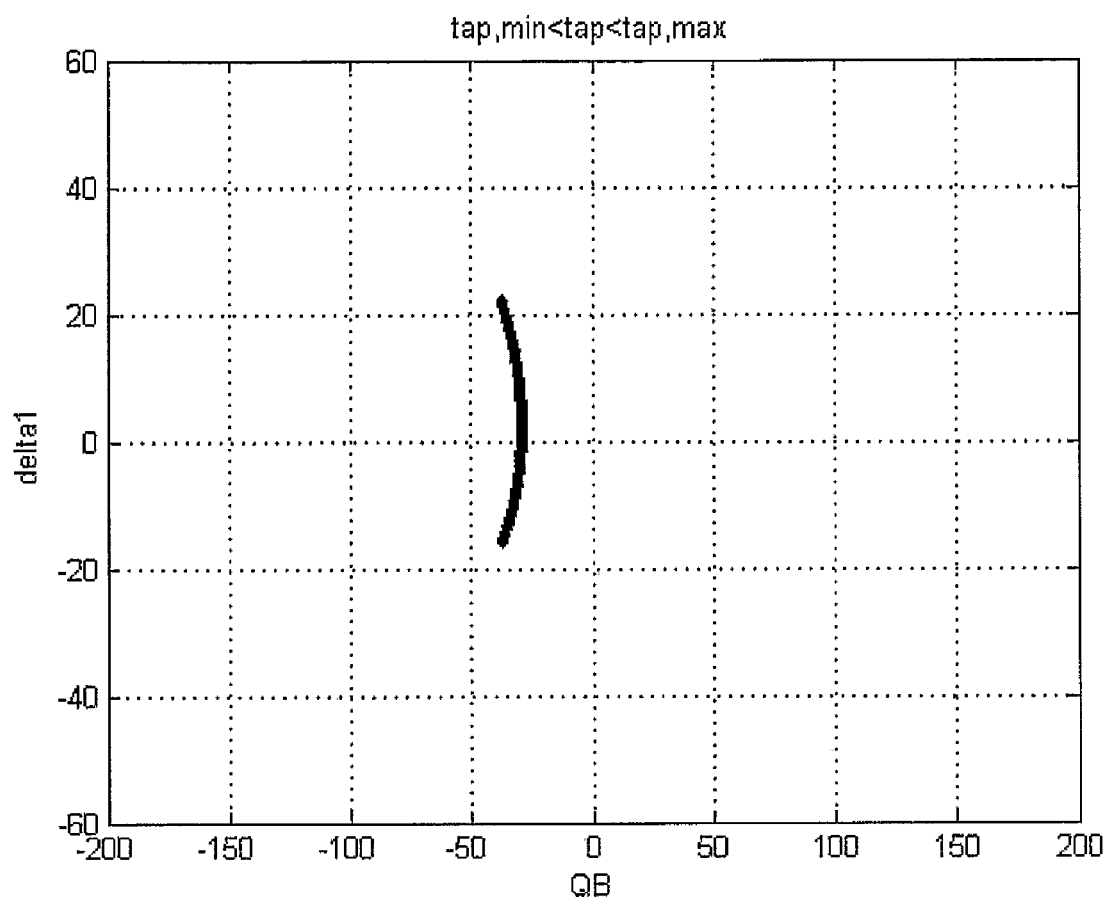
FIG. 3 illustrates the control range of the prior art phase-shifting transformer of FIGS. 1 and 2.
Figure 4:
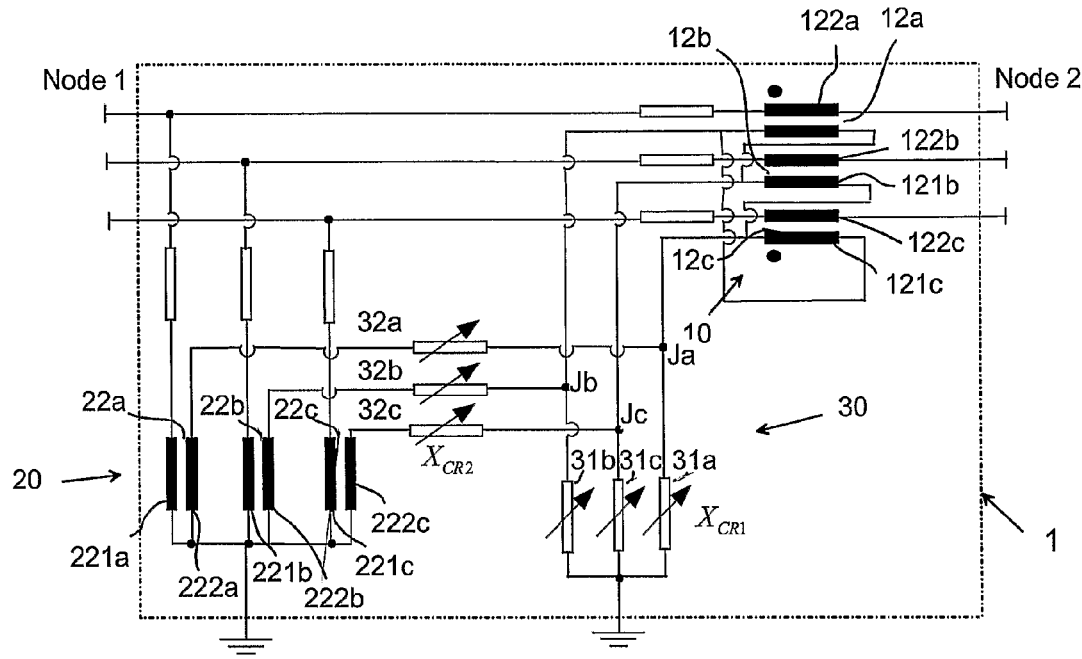
FIG. 4 is a principal three-phase circuit diagram of a first embodiment of a control device according to the invention.
Figure 5:
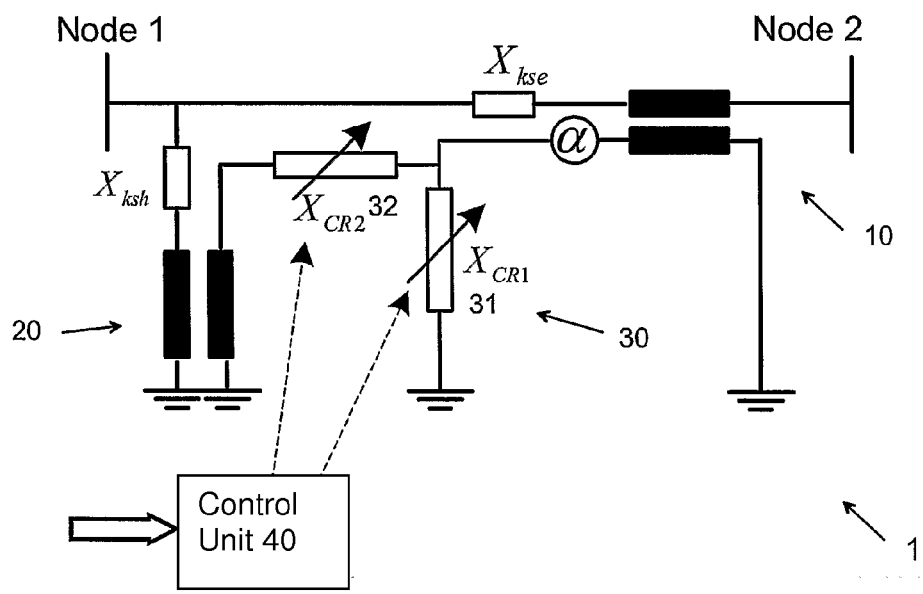
FIG. 5 is a simplified positive sequence circuit of the control device of FIG. 4.

A device for controlling the power flow according to the invention, generally designated 1, is shown in FIGS. 4 and 5. The device comprises a series transformer unit 10, a shunt transformer unit 20, a controllable reactance unit 30 comprising two controllable reactances (XCR1 and XCR2) 31 and 32, and a control unit 40 controlling the reactance values of the controllable reactances. The units are adapted for three-phase operation. This means that the series transformer unit comprises three transformers 12a-c, each comprising a primary winding 121a-c and a secondary winding 122a-c. For each phase, the primary winding being adapted to be supplied with a voltage that is dependent on a controllable part of the voltage between the other two phases of the transmission line, while the secondary winding being adapted for serial connection into the respective phase of the transmission line.

The shunt transformer unit 20 comprises, for each of the phases of the transmission line, a shunt transformer 22a-c with a primary exciter winding 221a-c and a secondary regulating winding 222a-c. The primary winding is connected between the transmission line and ground and the secondary winding is connected to the controllable reactance unit 30, as will be explained below.

The controllable reactance unit 30 comprises, for each of the phases of the transmission line, a first and a second controllable reactance 31a-c and 32a-c serially connected between the secondary winding of the shunt transformers and ground. Junction points Ja, Jb, and Jc are provided between the first and second controllable reactances and the primary winding of the series trans-former of each of the phases is connected to the junction points between the controllable reactances of the other two phases of the transmission line.

The controllable reactances, which are connected to the control unit 40 by means of which the reactance values are controlled, will be controlled such that if the first controllable reactance is controlled in a positive control range (corresponding to positive reactance values XCR1) then the second controllable reactance is controlled in a negative control range XCR2 and vice versa. This means that the first controllable reactances 31a-c and the second controllable reactances 32a-c are controlled in opposite control ranges. Whether XCR1 is controlled in a positive or negative control range will depend on the wiring arrangement (i.e. the sign of β) of the device and a switch arrangement (not shown) can be provided for switching between positive and negative control ranges.

The two degrees of freedom in terms of control parameters can now be used to control both the series voltage induced in series with the line and the reactive power balance of the device. By controlling the reactive power balance, the voltage in e.g. Node 1 can be controlled. Thus simultaneous control of power flow and voltage magnitude control may be achieved.

Figure 6:
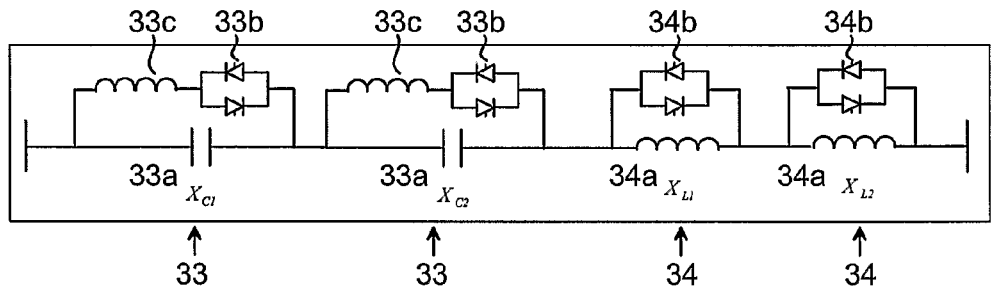
FIG. 6 is a realization of a controllable reactance comprised in the control device of FIGS. 4 and 5.

FIG. 6 shows a generic preferred implementation of a controllable reactance XCR, such as controllable reactances 31 and 32. The XCR consists in this case of two capacitive thyristor switched reactance steps 33 and two inductive thyristor switched reactance steps 34. The number of steps may vary from installation to installation. The controllable reactance may also consist of only capacitive steps or only inductive steps.

Each of the capacitive XCR steps 33 of FIG. 6 comprises a capacitive unit 33a and a thyristor switch 33b for connecting and disconnecting the capacitive unit. In the embodiment shown each of the capacitive steps 33 further comprises an inductive unit 33c in series with the thyristor switch 33b, the inductive unit being connected in parallel with the capacitive unit. The inductive unit 33c only serves the function of improving the switching performance of the reactance unit. In the embodiment shown in FIG. 6 the XCR further comprises two inductive steps 34, which each includes an inductive unit 34a in parallel with a thyristor switch 34b for connecting and disconnecting the inductive unit.

It lies within the scope of the invention to combine any number of capacitive and inductive steps. Thus the controlled series compensation device may comprise a plurality of both capacitive and inductive circuits.

The XCR 31, 32 of the controllable reactance unit 30 may be realized in different configurations. In a first embodiment shown in FIG. 7 the XCR comprises switchable capacitive units by which the XCR is controllable in discrete steps. In a second embodiment shown in FIG. 8 the XCR comprises switchable inductive units by which the XCR is controllable in discrete steps. In a third embodiment shown in FIG. 9 the XCR comprises a combination of capacitive and inductive units and thus being controllable in discrete steps. In a fourth embodiment shown in FIG. 10 the XCR comprises a plurality of boostable capacitive steps and a plurality of inductive step that offers the XCR to be continuously controllable.

In the first one-sided discrete embodiment of the invention the XCR comprises only capacitive units. Assuming that the two capacitive steps are thyristor switched and that $$X_{C2}=2X_{C1}$$

Figure 7:
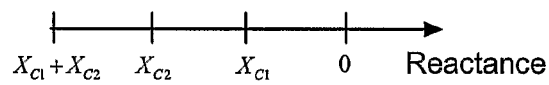
FIG. 7 is a one sided capacitive discrete function of the controllable reactance.

The XCR units have thus a capacitive control range divided into discrete steps as illustrated in FIG. 7.

In the second one-sided discrete embodiment of the invention the XCR comprises only inductive units. Assuming that the two inductive steps are thyristor switched and that $$X_{L2}=2XL_{L1}$$

Figure 8:
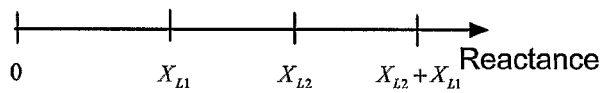
FIG. 8 is a one sided inductive discrete function of the controllable reactance.

The XCR units have thus an inductive control range divided into discrete steps as illustrated in FIG. 8.

In the further embodiment of the invention the XCR comprises a plurality of both capacitive and inductive units. The discrete controlling capability is illustrated in the following way. Assume that both the two capacitive steps and the inductive step are thyristor switched (i.e. no boosting which produces harmonics), and that $$X_{C2}=2X_{C1}$$

$$|X_L|=2X_{C2}|$$

Figure 9:
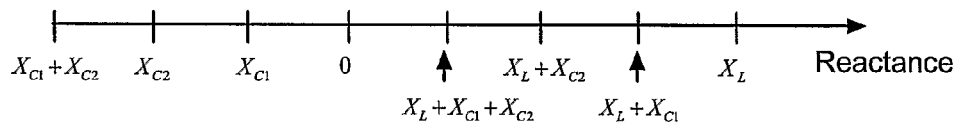
FIG. 9 is a discrete control function of the controllable reactance.

The XCR parts have thus a capacitive and/or inductive control range divided into discrete steps as illustrated in FIG. 9.

A continuous controllable embodiment according to the invention is illustrated in the following way (the number of steps can of course be changed). In this embodiment the XCR comprise a plurality of inductive units and a plurality of capacitor units that are continuously controllable (boostable). Assume that the capacitive units are boostable such that they are continuously controllable between $$|X_{CB1}^{max}| \geq X_{CB1} \geq |X_{CB1}^{min}| \text{ and}$$
$$|X_{CB2}^{max}| \geq X_{CB2} \geq |X_{CB2}^{min}|$$

where $$X_{CB1}^{max}=2X_{CB1}^{min}, X_{CB2}^{min}=2X_{CB1}^{min},$$
$$X_{CB2}^{max}=3X_{CB1}^{min}$$

and that the inductive part has the size $$|X_L|=|2X_{CB2}^{min}|$$

Figure 10:
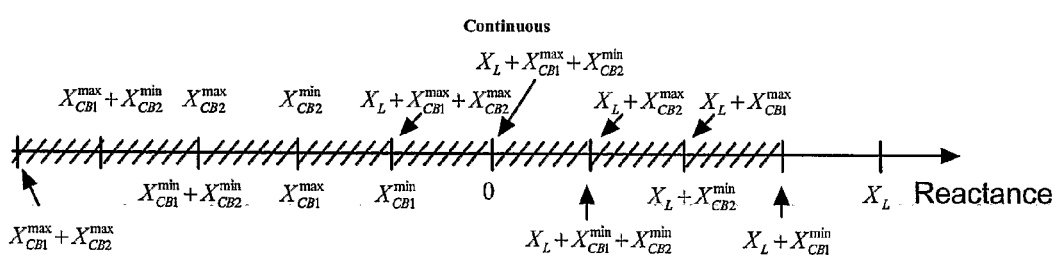
FIG. 10 is a continuous control function of the controllable reactance.

The XCR parts are thus continuous controllable in the range illustrated in FIG. 10.

The control resolution of the device according to the invention is in this embodiment made infinite over a large portion of the control range.

Figure 11:
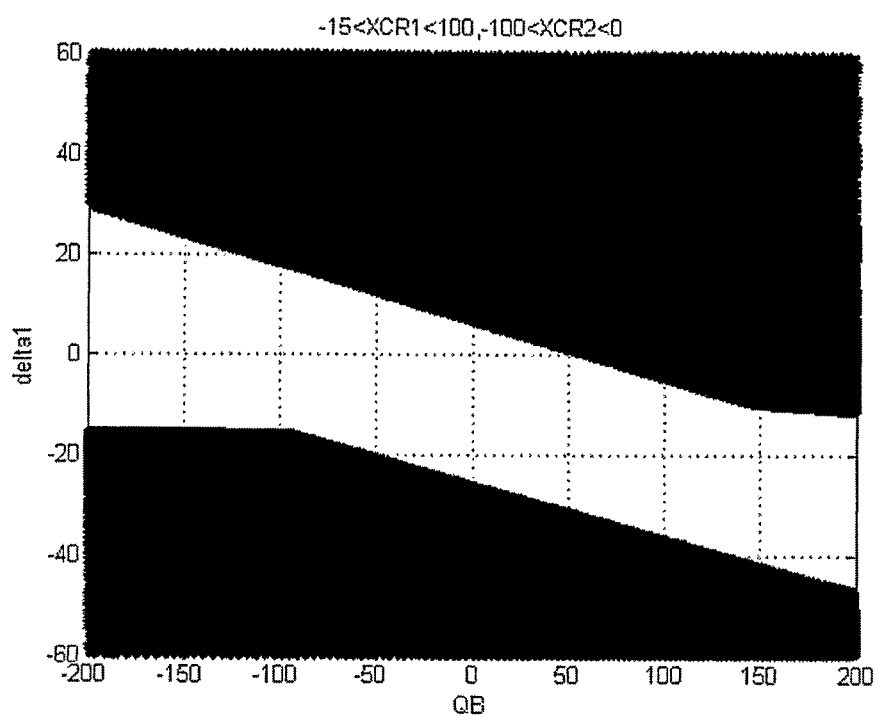
FIGS. 11 and 12 show parts of the control range of the control device shown in FIGS. 4 and 5.
Figure 12:
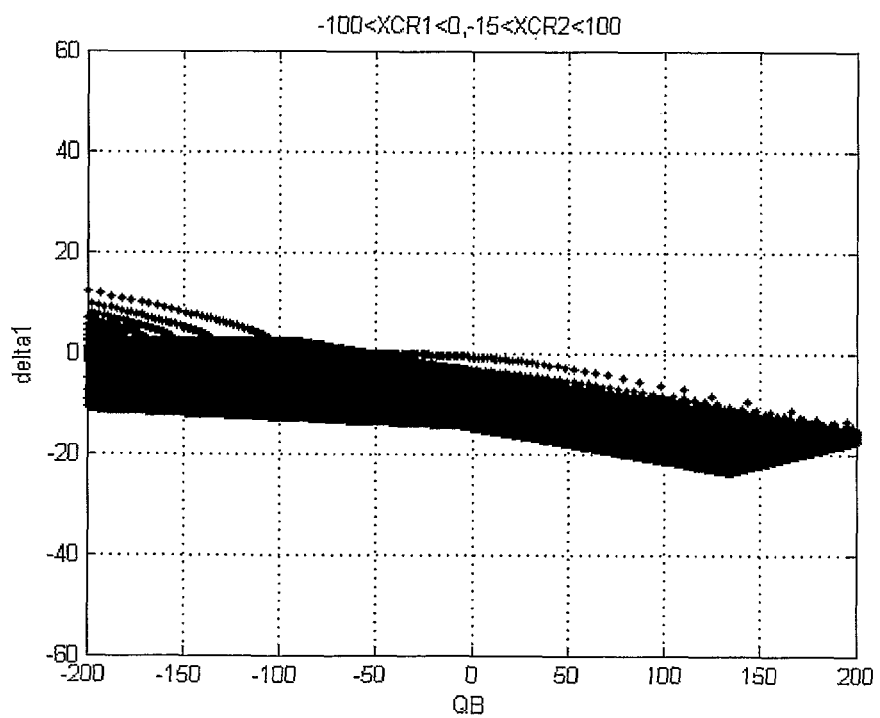

FIGS. 11 and 12 show parts of the control range of the device according to the invention in terms of phase-shift and reactive power balance for two different regions of the control parameters XCR1 and XCR2. It can be seen that most phase-shifts between −60 and +60 degrees can be achieved and that they can be achieved at different reactive power balances. It should be noted that the dynamic response in terms of changing operating point is fast as compared to the classical PST since according to the invention the change is accomplished through thyristor switching.

Figure 13:
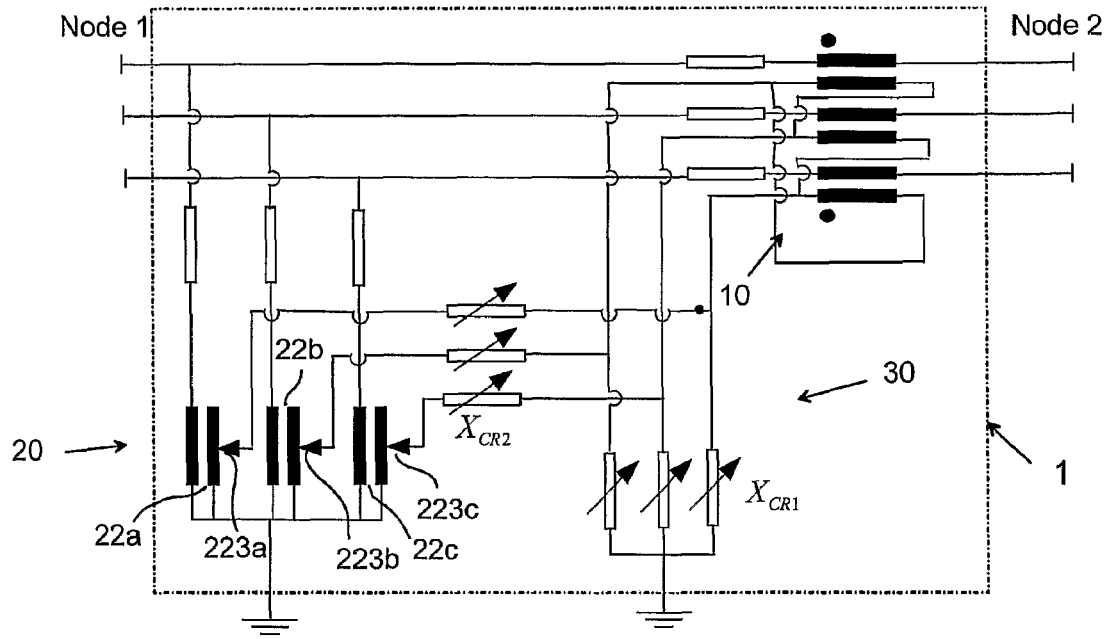
FIG. 13 is a principal three-phase circuit diagram of a second embodiment of a control device according the invention.
Figure 14:
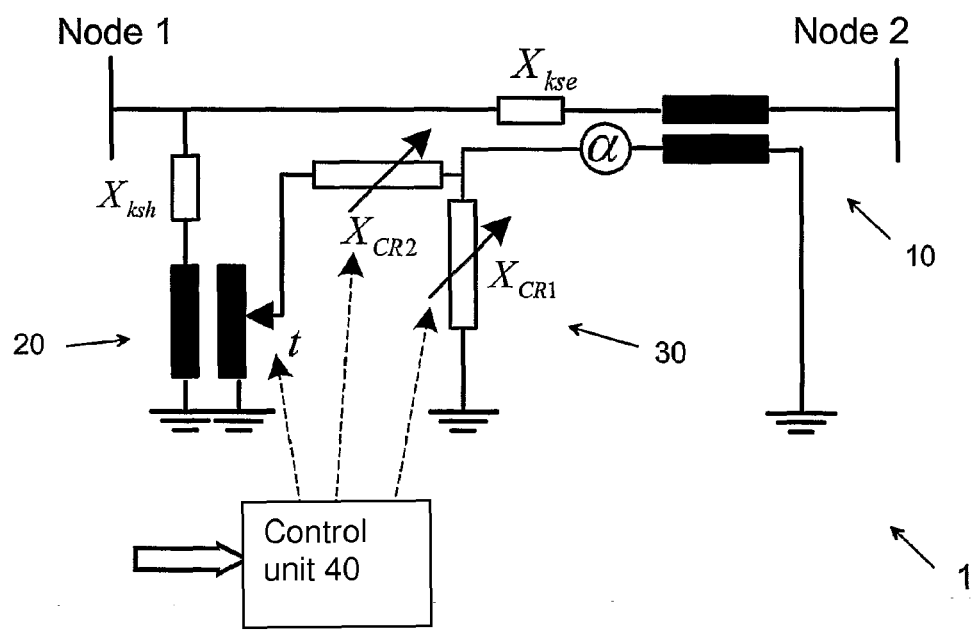
FIG. 14 is a simplified positive sequence circuit of the control device shown in FIG. 13, FIGS. 15-22 show parts of the control range of the control device shown in FIGS. 13 and 14.

FIGS. 13 and 14 show an embodiment of the invention identical to the embodiment shown in FIGS. 4 and 5 with the exception that the second regulating winding of the shunt transformers 22a-c in addition is equipped with a tap-changer 223a-c including a plus/minus switch (not shown) for slow adjustment of the over-all control range.

Figure 15:
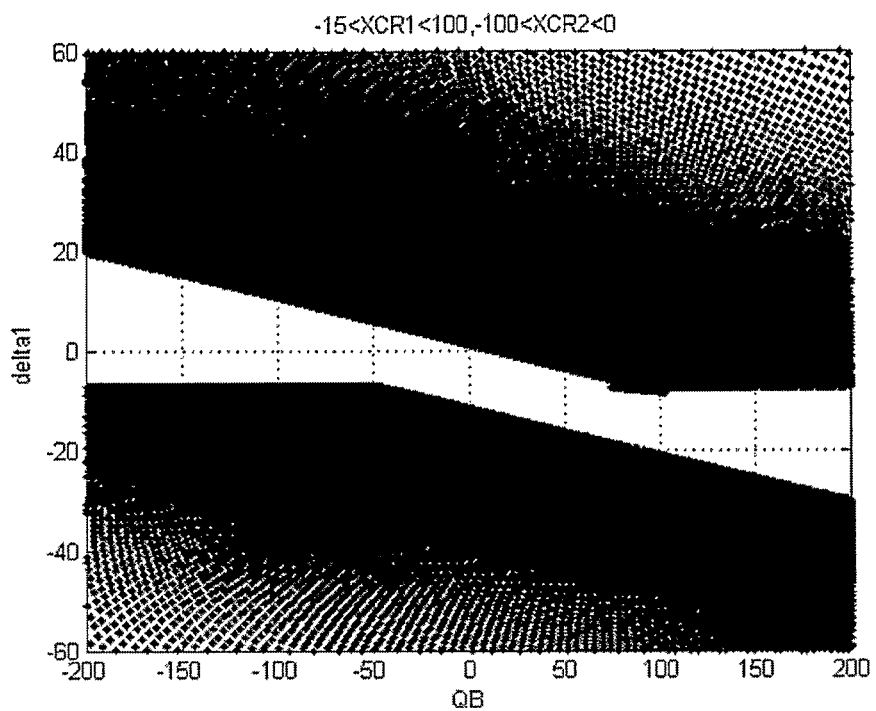
Figure 16:
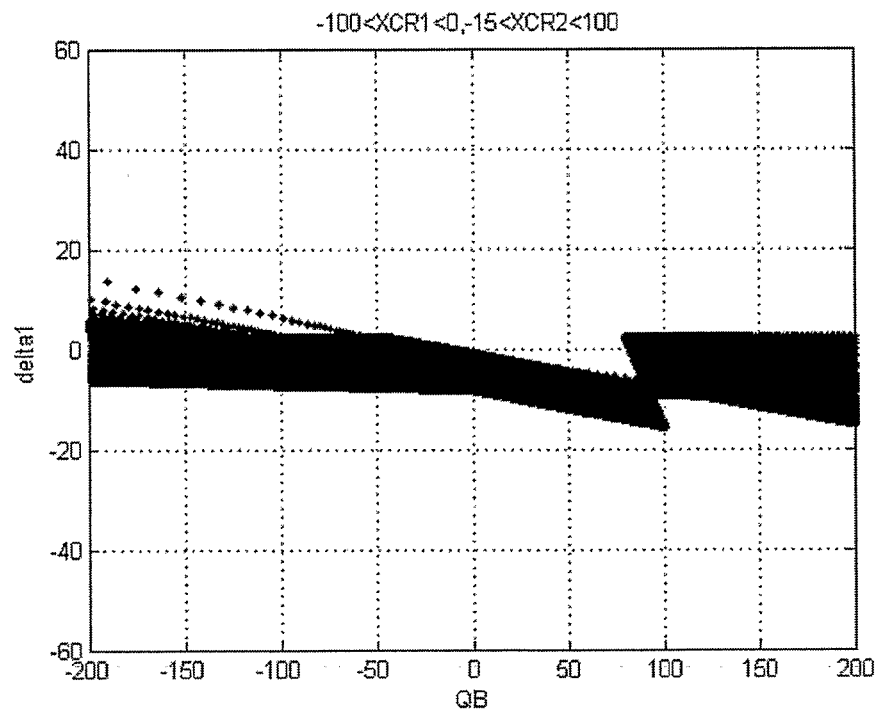
Figure 17:
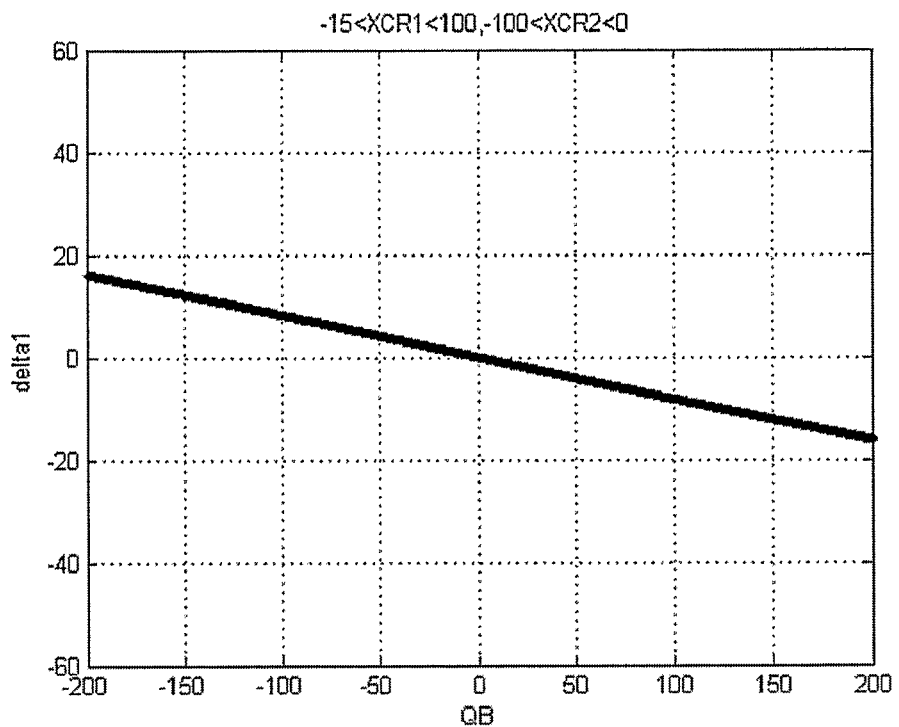
Figure 18:
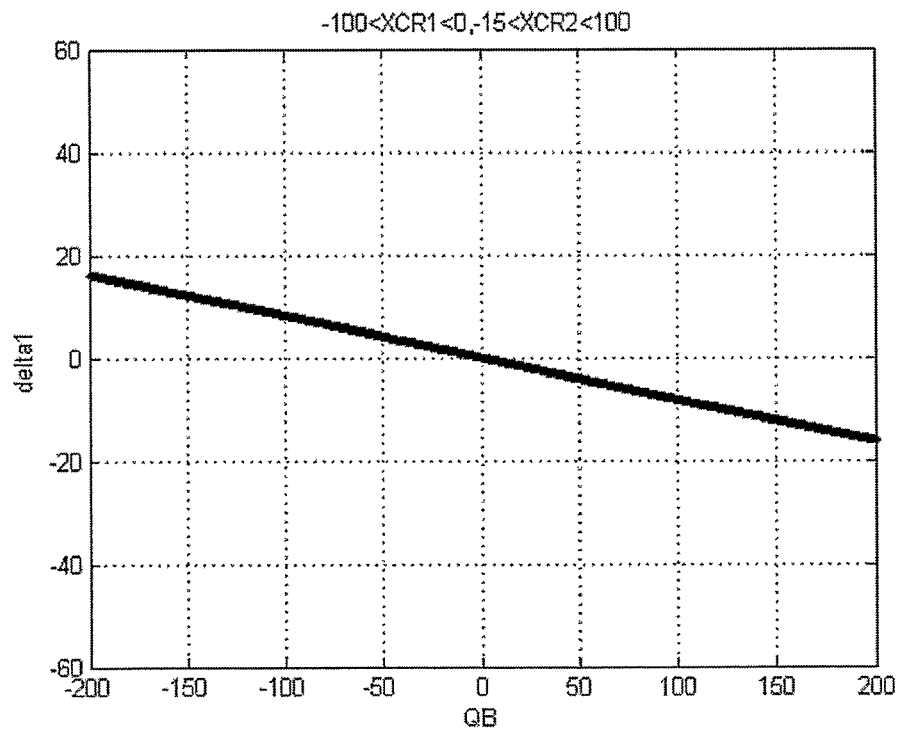
Figure 19:
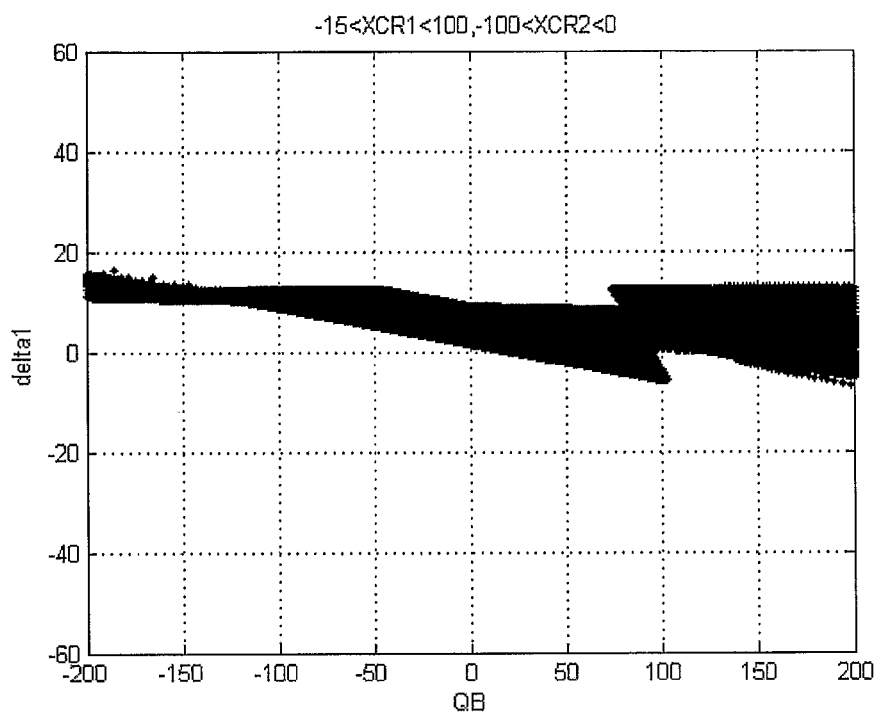
Figure 20:
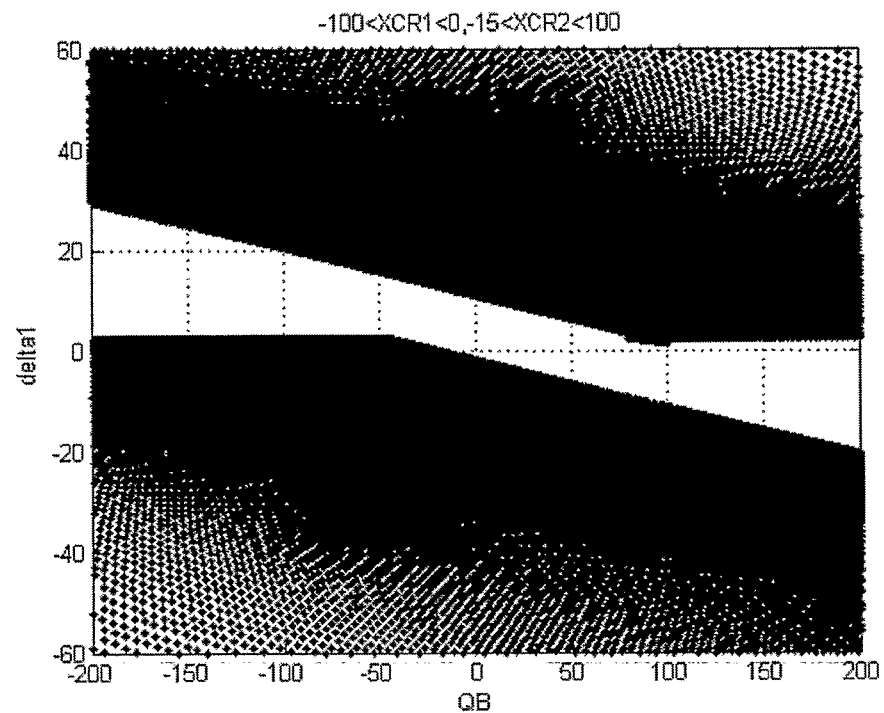
Figure 21:
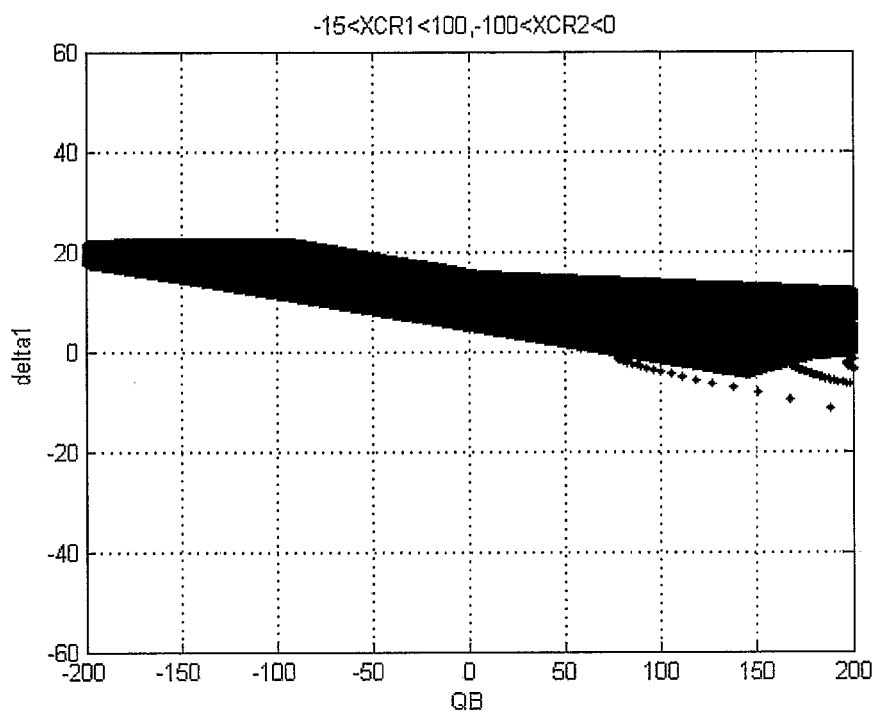
Figure 22:
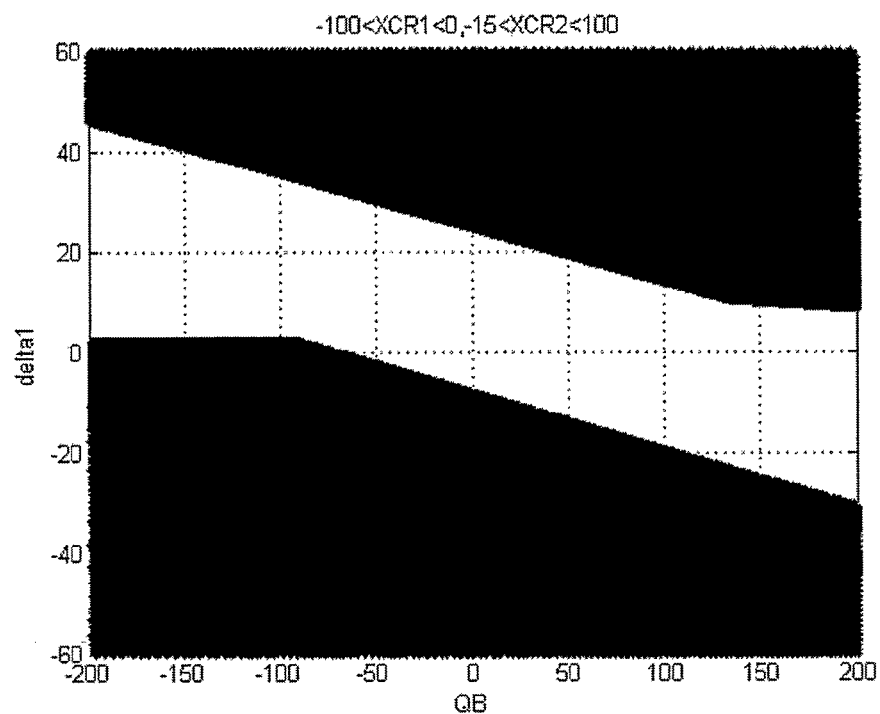

Obviously, in this embodiment the control range shown in FIGS. 11 and 12 can be achieved with the tap-changer in one end-position (which we may denote max-tap). If the tap instead is positioned half-way to max-tap, the control range shown in FIGS. 15 and 16 is obtained. In the neutral position the control range in FIGS. 17 and 18 is obtained. If the plus/minus switch is operated such that the opposite tap-changer action can be accomplished, the end-position of the tap-changer may be denoted min-tap. If the tap is positioned half-way to min-tap, the control range shown in FIGS. 19 and 20 is obtained. And finally if the tap-changer is positioned at min-tap the control range in FIGS. 21 and 22 can be achieved.

It is thus possible to slowly adjust the dynamic operation range in terms of both phase-shift and reactive power balance.

With dynamic operating range it is meant the part of the operating range that can be controlled fast enough to mitigate the consequences of electro-mechanical, transients in a power system. As the thyristor controlled reactances XCR1 and XCR2 easily can change operating point from maximum capacitive to maximum inductive and vice versa within a fraction of a second, it is well suited for contributing to e.g. damping of power oscillations originating from electro-mechanical oscillations in synchronous machines (generators). The tap-changer on the other hand, where each step takes in the order of five seconds and each step must be sequentially passed, is too slow to actively contribute in the transient period. In other words, the dynamic part of the operating range of the device corresponds to the operating range of the controllable reactances.

However, by controlling the tap-changer in the pre-disturbance situation the over-all characteristics of the control device can be changed.

The main control objectives, i.e. the reasons for installing a control device according to the invention, include one or several of the following:
Slow/quasi-steady state power flow control
Fast dynamic power flow control
Fast dynamic voltage support
Power oscillation damping Slow/quasi-steady state power flow control is the slow control of the distribution of power between on one hand the transmission path in which the device according to the invention is installed and on the other hand parallel paths. Power flow control is mainly achieved by controlling the effective phase-shift of the device. The control speed requirements for meeting this objective are low enough to be satisfied by both a PST and the control device according to the invention.

The fast dynamic power flow control is the fast control of the distribution of power between on one hand the transmission path in which the device according to the invention is installed and on the other hand parallel paths in order to relieve parts of the system and thus mitigate in particular stability problems. Also fast dynamic power flow control is mainly achieved by controlling the effective phase-shift of the device.

The fast dynamic voltage support is achieved by quickly changing the reactive power balance of the device such that sufficient reactive power is produced such that a desired voltage can be maintained. This is essential in systems prone to voltage collapse. Similarly, if the voltage is too high, the production of reactive power can quickly be reduced or the consumption increased.

Power oscillation damping is the fast control of the device according to the invention to mitigate power oscillations typically following a disturbance in the power system. Power oscillation damping is mainly achieved by controlling the effective phase-shift of the device. The frequency of these oscillations are typically in the range of 0.1-2.0 Hz and depends to a large extent on the inertia constants of the synchronous machines (typically generators) or groups of machines participating in the oscillation. The control speed requirement to meet this objective is satisfied by the thyristor controlled XCR1 and XCR2.

By quickly, within a fraction of the transient period following a disturbance, changing the operating point of XCR1 and XCR2, the character of the transmission interconnection on which the device according to the invention is installed can be changed. In particular if several devices are installed and their controls are coordinated, the disturbed part of the system experiencing e.g. stability problems can quickly be relieved of power transfer whereas an intact part of the system picks up the power transfer. By having the capability to go between end positions of the control range within say less then 0.5 s after the disturbance occurs, the transient performance of the overall inter-connected system can thus be significantly improved. The tap-changer is too slow to act within this time frame however its pre-disturbance operating point will affect the overall character of the invention and thus the transmission interconnection.

The tap-changer is primarily controlled to provide the device with a favorable dynamic range with respect to the conceivable contingencies at hand. The number of tap-changer operations is therefore expected to be quite low for a given installation, which therefore reduces the maintenance requirements on the tap-changer.

Reactive power is consumed due to the short circuit reactance of the shunt and series transformers, which only has a small variation due to tap-changer position as compared to XCR1 and XCR2 which reactances has a substantially larger variation due to its nature. XCR1 and XCR2 may as a consequence produce or consume a considerable amount of reactive power depending on how many capacitive and inductive steps that are switched in. The possibility to simultaneously perform both power flow control and voltage support control is a major advantage. If e.g. the power system for some reason is weak in terms of voltage support, i.e., the voltages are low, it is advantageous to produce reactive power or at least limit the overall consumption of reactive power of the device. Similarly, if the voltages are high it is advantageous to consume reactive power or at least limit the overall production of reactive power of the device.

Figure 23:
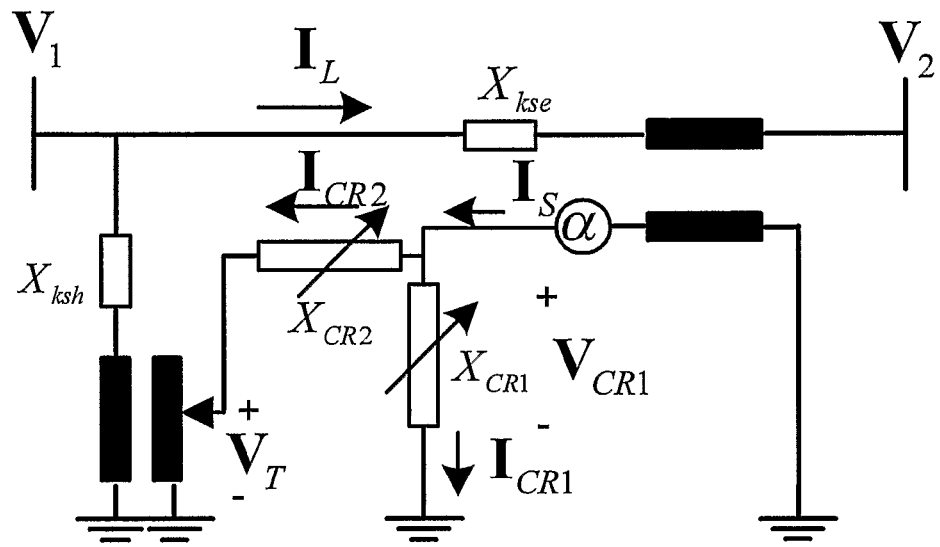
FIG. 23 shows the positive sequence diagram of FIG. 14 together with a simplified phasor diagram.
Figure 23:
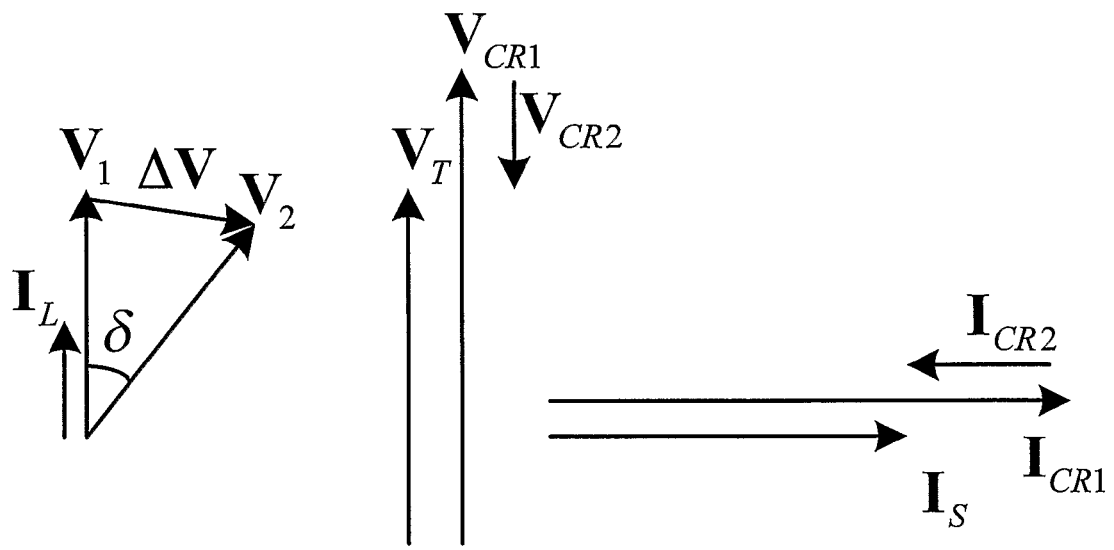

FIG. 23 shows a positive sequence diagram of the device shown in FIG. 14 together with a simplified phasor diagram (phasors are shown in bold face). The effective phase shift δ between the node voltages in Node 1 and Node 2 will depend on the injected series voltage and the voltage drop across the short circuit reactance of the series transformer. The line current, $I_L$, is in most cases more or less collinear with the node voltages (assuming a predominantly active power transfer). The internal current coming from the series transformer, $I_S$, is shifted the angle β (+90 or −90 degrees) relative the line current. This current is the sum of the currents through XCR1, $I_{CR1}$, and XCR2, $I_{CR2}$. The current $I_{CR2}$ is then transformed and injected into the system in Node 1.

The voltage across XCR1, $V_{CR1}$, is proportional to the injected voltage which in turn essentially is equal to ΔV (neglecting the voltage drop across the short circuit reactance of the series transformer). In other words, by controlling the magnitude of $V_{CR1}$ it is possible to control the phase-shift, δ. The voltage magnitude of $V_{CR1}$ is equal to the product of the current through XCR1 and the reactance of XCR1. Furthermore, the magnitudes of the currents $I_{CR1}$ and $I_{CR2}$ will depend on the size and sign of XCR1 and XCR2 for a fixed voltage $V_T$ (which is controlled by the tap-changer). Now, the reactive power balance will essentially (neglecting the contributions from transformer short circuit reactances for simplicity) be equal to the square of the current through XCR1 and XCR2 times the respective reactances. Thus by controlling the size and sign of XCR1 and XCR2 it is possible to control both the phase-shift and the reactive power balance of the device.

Figure 24:
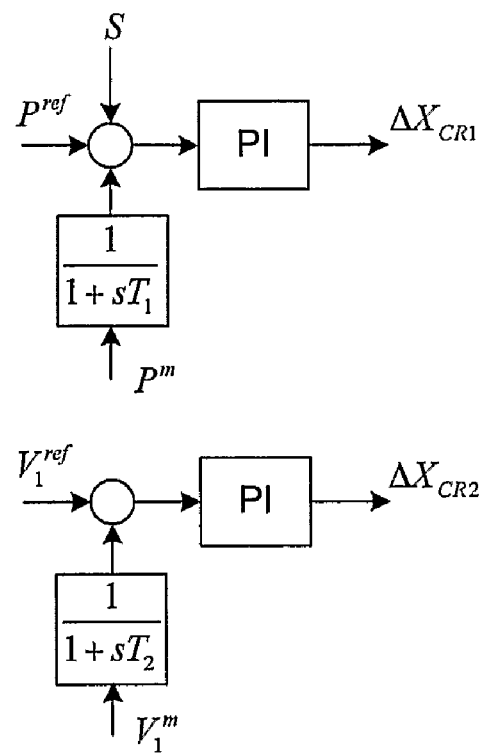
FIGS. 24 and 25 show control schemes used with the control device according to the invention.

The control objectives above may be implemented in a number of different ways. A preferred implementation is outlined in FIG. 24. The control scheme consists of two control loops which may have different time responses to avoid hunting. The upper loop measures active through power $P^m$ and compares this with a reference value $P^{ref}$. If there is a control error a PI-regulator will act by increasing or decreasing XCR1. In other words, the power flow control is achieved by controlling the phase-shift. The second loop measures the magnitude of the voltage in Node 1, $V_1^m$ and compares this with a reference value $V_1^{ref}$. If there is a control error a PI-regulator will act by increasing or decreasing XCR2. In other words, the voltage control is achieved by controlling the reactive power balance. The time response of the two loops can be controlled by tuning the time constants $T_1$ and $T_2$ appropriately.

Figure 25:
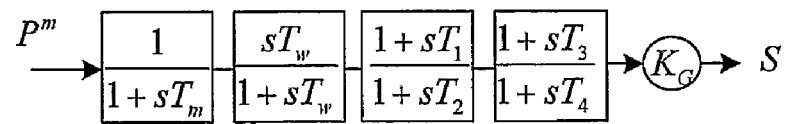

Power oscillation damping may be provided through a supplementary signal, S. This signal may be generated as indicated in FIG. 25, where the first block contains the time constant of the measuring device, the second block is a wash-out block which picks up the power oscillation, the third and fourth blocks are lead-lag blocks which provide the supplementary signal with the correct phase-shift relative the power oscillation, and finally a gain which provides the supplementary signal with an appropriate amplification.

Although favorable the scope of the invention must not be limited by the embodiments presented but contain also embodiments obvious to a person skilled in the art.

It is important to avoid high voltages across XCR1 and XCR2, which could damage the device. The control system should thus have protective limitations implemented in the control system such that high voltages across these reactances quickly are reduced. Furthermore, they should be protected by surge arresters for further protection.

Thyristors controlled reactances have been described. It will be appreciated that also other kinds of power semiconductors can be used for controlling the reactances.

The invention claimed is:

1. A device for control of power flow in a three-phase ac transmission line, the device comprising:
    a series transformer unit comprising for each of the phases of the transmission line a series transformer comprising a primary winding and a secondary winding, wherein the secondary winding is adapted for serial connection into a respective phase of the transmission line,
    a shunt transformer unit comprising for each of the phases of the transmission line a shunt transformer comprising a primary winding and a secondary winding, wherein the primary winding is adapted to be connected between the transmission line and ground, and
    a reactance unit comprising for each of the phases of the transmission line, a first and a second controllable reactance serially connected between the secondary winding of the shunt transformers and ground,
    wherein junction points are provided between the first and second controllable reactances, and
    wherein the primary winding of the series transformer of each of the phases is connected to the junction points between the controllable reactances of the other two phases of the transmission line.

2. The device according to claim 1, wherein the controllable reactances comprise semiconductors for controlling the reactance values.

3. The device according to claim 1, wherein each of the shunt transformers comprises a tap-changer to which the respective controllable reactance is connected.

4. The device according to claim 1, wherein the first controllable reactances and the second controllable reactances have opposite control ranges.

5. The device according to claim 1, wherein the controllable reactances have capacitive and/or inductive control ranges divided into discrete steps.

6. The device according to claim 1, wherein the controllable reactances have capacitive and/or inductive control ranges that are continuously controllable.

7. The device according to claim 1, wherein each of the controllable reactances comprises capacitive steps, each capacitive step comprising an inductive unit in series with a semi-conductor switch, the inductive unit being connected in parallel with a capacitive unit.

8. The device according to claim 1, wherein each of the controllable reactances comprises inductive steps, each inductive step comprising an inductive unit in parallel with a semi-conductor switch.

9. A method of controlling a device for control of power flow in a three-phase ac transmission line, the device comprising a series transformer unit comprising for each of the phases of the transmission line a series transformer comprising a primary winding and a secondary winding, wherein the secondary winding is adapted for serial connection into a respective phase of the transmission line, a shunt transformer unit comprising for each of the phases of the transmission line a shunt transformer comprising a primary winding and a secondary winding, wherein the primary winding is adapted to be connected between the transmission line and ground, and a reactance unit comprising for each of the phases of the transmission line, a first and a second controllable reactance serially connected between the secondary winding of the shunt transformers and ground, wherein junction points are provided between the first and second controllable reactances, and wherein the primary winding of the series transformer of each of the phases is connected to the junction points between the controllable reactances of the other two phases of the transmission line, the method comprising:

changing the reactance values of the controllable reactances.

10. The method according to claim 9, wherein each of the shunt transformers of the device comprises a tap-changer to which the respective controllable reactance is connected, the method further comprising:

controlling the tap-changer to change the over-all characteristics of the device.

* * * * *